United States Patent [19]
Shirley et al.

[11] Patent Number: 5,258,056
[45] Date of Patent: Nov. 2, 1993

[54] PSA SYSTEM WITH PRODUCT TURNDOWN AND PURITY CONTROL

[75] Inventors: Arthur I. Shirley, Piscataway; Alberto I. LaCava, South Plainfield, both of N.J.

[73] Assignee: The BOC Group, Inc., New Providence, N.J.

[21] Appl. No.: 766,995

[22] Filed: Sep. 27, 1991

[51] Int. Cl.$^5$ .............................. B01D 53/04
[52] U.S. Cl. ............................. 95/22; 95/97; 95/138; 96/114; 96/130; 55/218; 55/271
[58] Field of Search ............ 55/18, 21, 25, 26, 58, 55/62, 68, 74, 75, 160–163, 179, 210, 218, 271, 387, 389

[56] References Cited

U.S. PATENT DOCUMENTS

| | | | |
|---|---|---|---|
| 3,257,772 | 6/1966 | Maddox et al. | 55/21 X |
| 3,703,068 | 11/1972 | Wagner | 55/21 |
| 4,140,495 | 2/1979 | Pietruszewski | 55/21 |
| 4,197,095 | 4/1980 | White, Jr. et al. | 55/21 X |
| 4,315,759 | 2/1982 | Benkmann | 55/18 |
| 4,323,370 | 4/1982 | Leitgeb | 55/18 |
| 4,561,287 | 12/1985 | Rowland | 55/21 X |
| 4,576,614 | 3/1986 | Armond et al. | 55/18 |
| 4,693,730 | 9/1987 | Miller et al. | 55/18 |
| 4,725,293 | 2/1988 | Gunderson | 55/162 |
| 4,806,132 | 2/1989 | Campbell | 55/18 X |
| 4,857,082 | 8/1989 | DiMartino, Sr. et al. | 55/218 X |
| 4,857,086 | 8/1989 | Kawai | 55/271 X |
| 4,927,434 | 5/1990 | Cordes et al. | 55/21 X |
| 4,995,889 | 2/1991 | Abel et al. | 55/21 |
| 5,042,994 | 8/1991 | Smolarek | 55/18 |

FOREIGN PATENT DOCUMENTS

| | | | |
|---|---|---|---|
| 57-071804 | 5/1982 | Japan | 55/18 |
| 64-007001 | 2/1989 | Japan | 55/18 |
| 2-157011 | 6/1990 | Japan | 55/18 |
| 2003742 | 3/1979 | United Kingdom | 55/18 |

*Primary Examiner*—Robert Spitzer
*Attorney, Agent, or Firm*—Coleman R. Reap; Larry R. Cassett

[57] ABSTRACT

Apparatus and process for the production of a purified product gas at a user specified product gas demand from a feed gas containing impurities which includes at least one treatment zone having an inlet and outlet region, a sensing device for detecting a change in product gas demand, a device for generating a first signal, a device for translating the first signal and comparing the same to a standard, and a device for converting the translated signal to a second signal which operates a valve to vary the feed rate of the gas entering the system.

17 Claims, 3 Drawing Sheets

5,258,056

PSA SYSTEM WITH PRODUCT TURNDOWN AND PURITY CONTROL

TECHNICAL FIELD

The present invention relates to a pressure swing adsorption system in which the flow of feed gas is adjusted in accordance with a change in product demand or turndown for a given impurity level. The present invention also provides for minor adjustments to the flow rate of the feed gas in response to fluctuations in the purity level of the product gas.

BACKGROUND OF THE PRIOR ART

Adsorption techniques have been used in the separation of a variety of gases including hydrogen, helium, argon, carbon monoxide, carbon dioxide, nitrous oxide, oxygen, and nitrogen. Feed gases useful in these adsorption separations include air; refinery off gases; and landfill, flue, and natural gases.

Pressure swing adsorption (PSA) systems have been used to produce such gases by the preferential adsorption of impurities contained in the feed gas. PSA systems typically operate in a cyclical process in which beds containing an adsorbent are pressurized to operating pressure with a feed gas, impurities are removed from the feed gas to obtain a product gas, and the beds are regenerated to remove impurities from the system. When multiple beds are used, a pressure equalization step may be employed to equalize the pressure between an exhausted adsorbent bed containing impurities and a regenerated bed substantially free of impurities.

It is likely in the commercial operation of PSA systems that demand for product gas may increase or decrease from time to time. For example, PSA systems are often required to produce product gas at higher rates during normal working hours than during off-hours. Various methods of meeting this variable demand or product turndown have been attempted. These include venting excess product gas, lengthening the cycle time, storing excess product gas, or temporarily shutting down the system.

Wagner, U.S. Pat. No. 3,703,068, discloses a multi-bed PSA system wherein the pressurization rate of successive beds is controlled by the introduction of fluctuations in the product flow and pressure.

The quantity of product gas withdrawn can also be regulated according to product gas withdrawal demand by advancing cycles in successive and parallel cycle systems rather than running them concurrently, as disclosed in Pietrusewsk;, U.S. Pat. No. 4,140,495.

A variable rate compressor pump has also been utilized to correlate product demand to product supply as disclosed in Sebastian et al., U.S. Pat. No. 4,197,096.

Leitgeb, U.S. Pat. No. 4,323,370, discloses varying the length of time of the adsorption phase and the rate of flow of the product gas from the adsorber in response to a varying demand for the product gas. The flow rate and adsorption cycle times are determined as a function of a desired product gas purity and not of the actual product produced by the system.

Product turndown in a multi-bed system has also been regulated by varying the equalization time as described in Armond et al., U.S. Pat. No. 4,576,614.

None of these systems, however, have provided a direct and immediate adjustment of the feed flow rate in response to a change in product demand for a given purity level.

It is known that for a given rate of gas production, a variation in the feed flow rate will cause an undesirable change in the purity of the gas product. This purity drift occurs because a change in the feed rate affects the manner in which the feed gas contacts the adsorbent material, such as by reducing the amount of time the feed gas is in contact with the adsorbent bed. As a result, varying the feed rate will vary the rate of gas production at the expense of the purity of the product.

It is also known that control of the purity level of a product gas can be accomplished in PSA systems by varying the product flow rates at a fixed cycle time. The product flow rate is set at a level greater than that needed by the consumer while the feed gas flow rate either is fixed by throttling or regulated automatically.

For example, purity control in the form of inventory control employing a surge vessel is disclosed in European Patent Publication No. 0 135 921.

Miller et al., U.S. Pat. No. 4,693,730, disclose a product purity control pressure swing adsorption process in which a characteristic of the effluent from concurrent depressurization is sensed, and corrective action is taken in response. Any action can be taken which is effective to vary the impurity concentration in the product gas including adjusting the adsorption time to control the impurity loading of each adsorbent bed, adjusting the concurrent depressurization termination pressure to control the impurity breakthrough at the product end of each adsorbent bed, and/or adjusting the amount of purge gas received from each adsorbent bed to control the extent of regeneration.

European Patent Publication No. 0 207 686 discloses controlling oxygen concentration by controlling variations in the cycle time at which a further adsorption bed is substituted for any exhausted or substantially exhausted bed prior to the purging of the latter bed.

Gunderson, U.S. Pat. No. 4,725,293, discloses a process of controlling purity by small variations in the feed flow rate while allowing product flow to vary at the choice of the consumer.

The undesirable result of these purity control systems is that any substantial change in product demand leads to a temporary change in purity level which can only be corrected by slowly varying the feed flow rate. Because the control system takes too long to respond to a change in product demand, there is a resultant undesirable purity change with a possible loss of product. Thus, prior art PSA systems have suffered from the disadvantage of being able to control product demand or purity but not both.

SUMMARY OF THE INVENTION

The present invention provides a system and process for the control of variations in product demand through direct and immediate regulation of the feed flow rate for a given purity level. Recognizing that a change in the feed flow rate can result in purity drift, the present invention optionally provides for the regulation of the purity level through direct and immediate adjustments to the feed flow rate.

In particular, the present invention relates to a PSA system for the production of a purified product gas at a user specified product gas demand from a feed gas containing impurities. The PSA system comprises at least one treatment zone where impurities are removed from the feed gas. The treatment zone includes an inlet region for receiving the feed gas and an outlet region for recovering a product gas. Means are provided for controlling the pressure in the treatment zone.

Means are also provided for detecting a change in product gas demand and for generating a signal corresponding to the change in product demand. An electronic sensor for measuring a change in a pressure decrease caused by the product gas flowing through a restrictive means and means for converting the pressure decrease to a detectable signal, such as an electrical signal, can be used for this purpose.

The signal is transmitted to a means for translating the signal and comparing it to a standard so as to obtain a determination of how much the product demand has changed. The translated signal is then converted to a detection means which operates a controllable feed gas adjustment means to directly alter the feed rate thereby varying the time it takes for the treatment zone to pressurize from an initial pressure to a production pressure.

As previously indicated, adjustment of the feed flow rate in response to a change in the product demand can result in a change in purity (i.e. purity drift). In accordance with a preferred embodiment of the invention, means are provided for sensing a change of the level of impurities in the product line and for generating a signal corresponding to the change in the purity level. This signal is then translated and compared to a standard to form a detectable signal. The detectable signal is then converted to a signal which directly controls the rate at which the feed gas enters the system.

In accordance with the present invention direct and immediate adjustments are made to the feed flow rate in response to a change in product demand alone or in combination with a subsequent change in the impurity level. As a result, less product gas is lost thereby increasing the efficiency of the PSA system over previously known PSA systems.

BRIEF DESCRIPTION OF THE DRAWINGS

The following drawings are illustrative of embodiments of the present invention and are not intended to limit the scope of the invention as encompassed by the claims forming part of the application.

DETAILED DESCRIPTION OF THE INVENTION

Figure 1:
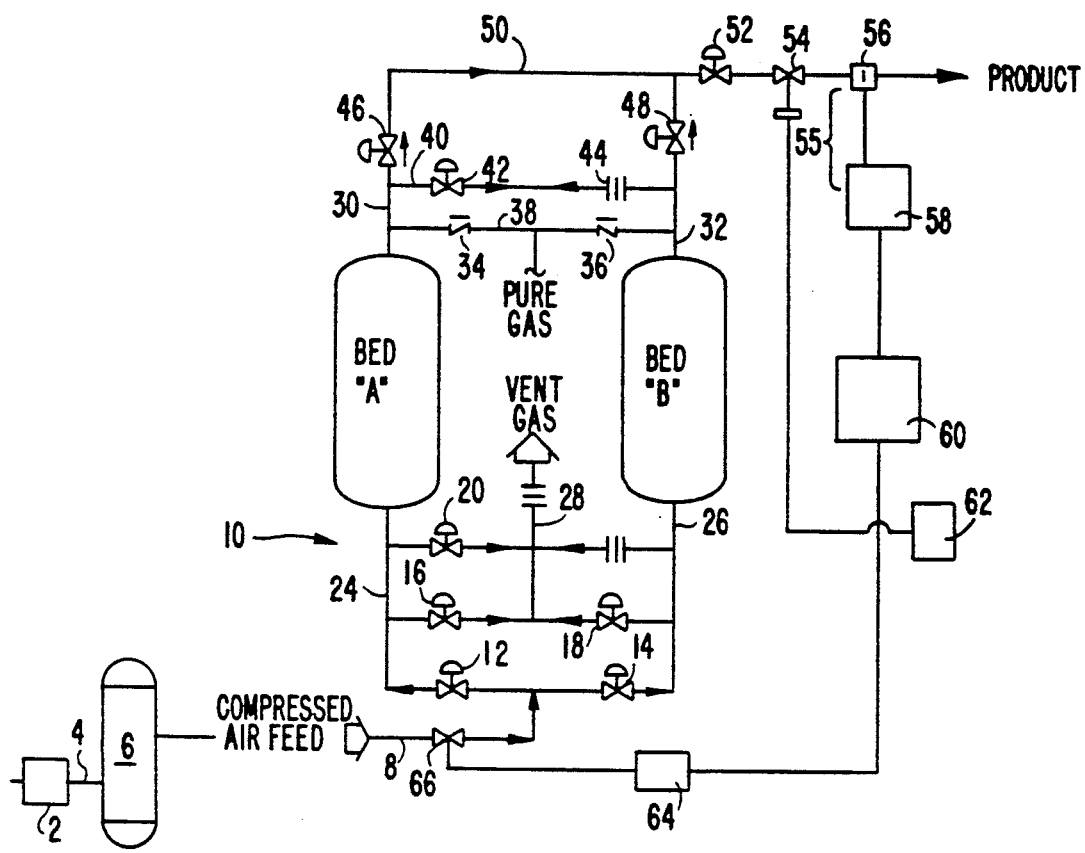
FIG. 1 is a schematic view of one embodiment of the invention employing a system for adjusting the feed flow rate in response to a change in product demand for a given purity level.

The present invention is directed to a PSA system wherein a highly pure gas such as nitrogen is produced by passing a feed gas such as air through at least one treatment zone preferably comprising an inlet region, an outlet region, and at least one impurity adsorbing material. The majority of the impurities of the feed gas are adsorbed in the treatment zone to produce a purified gas.

The PSA system treatment zone(s) of the present invention, in general, contain any adsorbent material having selectivity for one or more of the impurities of the gaseous feed mixture. Suitable adsorbents include zeolite molecular sieves, zeolites, activated carbon, carbon molecular sieves, silica compounds, aluminum compounds, and the like. The difference between the amounts of the impurities adsorbed at the lowest and highest pressures during the PSA cycle determine the efficiency of the separation. In accordance with the present invention, the treatment zone may contain one or more different adsorbents.

Adsorption in the present invention may also be conducted either batchwise or continuously. In either case, the treatment zone may be periodically regenerated by purging the accumulated impurities. In a batchwise system, purification of the feed gas must be stopped during regeneration of the treatment zone. In a continuous system, a plurality of treatment zones are used with at least one treatment zone producing purified gas while at least one other treatment zone is undergoing regeneration. Preferably, in multiple treatment zones, there is an equalization step wherein gas from one treatment zone at high pressure is allowed to flow to a treatment zone under low pressure. Regeneration is accomplished by subjecting nearly saturated or saturated treatment zones to a reduced pressure (atmospheric and/or subatmospheric pressure) provided by a mechanical vacuum pump, by venting to the atmosphere, by flow of a purge gas containing up to a small amount of the more readily adsorbed components or by a combination of any of the above.

Regardless of whether the adsorption is conducted in a batchwise or continuous fashion, the practice of the present invention is best done with steady flows of feed and product gas. Consequently, means of gas storage are preferably provided with the adsorber(s) to provide these steady flows.

Since both product purity and product flow rate are fixed in the present invention, the cycle and/or adsorption time is determined by the resultant feed flow rate and the required product flow rate. A PSA system must reach a minimum production pressure for effective adsorption to occur. Therefore, by slowing the feed flow rate to a treatment zone, the time necessary to reach a preset minimal production pressure is lengthened. The time to produce sufficient product at the production pressure may also be lengthened independently or concurrently by slowing the feed flow rate which in turn lengthens the total adsorption time, independently lengthening or further lengthening the cycle time. Variations in the equalization time can also be used to vary the cycle time. Additionally, the adsorption time can be adjusted in accordance with product demand independently of pressurization time.

Purity control involves further varying by small amounts, the feed flow rate which in turn leads to some change in the pressurization time, production time or a combination thereof to adjust the impurity level of product gas to a selected level.

A correlation between the amount of product flow rate turndown and the resultant adjustment in the feed flow rate must be calculated for each individual treatment zone as the characteristics of a particular treatment zone vary according to bed length, adsorbent composition and the like. Such calculations are routine for those of ordinary skill in the art. The amount of turndown in feed flow is generally greater than the turndown in product flow, particularly from small levels of product turndown, thereby giving the highest possible yield of product under any operating conditions.

The turndown portion of the present system may be controlled manually by an operator by reference to an appropriate turndown curve or may be controlled by a controlling means such as a turndown computer or the like into which the desired product flow rate is entered and which in turn determines appropriate feed flow rate turndown. Such a controlling means can be interfaced with automated valve controls and the like to control automatically the PSA plant as well.

The purity feedback portion of the system can be operated as often as necessary to maintain selected product purity without respect to the operation of the feed forward portion of the system. The purity of the product gas is sensed only during the feedback portion of the system. Therefore, purity may be sensed in accordance with the present invention at the beginning of each production step continuously throughout production, or intermittently during production.

The purity portion can also be controlled manually or by an automatic system such as a computer optionally interfaced with the valve controls of the PSA plant.

Referring to FIG. 1 there is shown an embodiment of the invention for the adjustment of the feed flow rate in response to a change in product demand at a given purity level. For purposes of this embodiment, the system will be described for the separation of air and the recovery of nitrogen gas at a purity level exceeding 99.9%. It will be understood that the system is also applicable to the separation of other gases into substantially pure components thereof.

Air is sent to a compressor 2 where it is compressed up to operating pressure of typically about 75 to 150 psig. The compressed air flows via a line 4 to a storage vessel 6 and via a line 8 to a two bed (beds A & B) PSA system shown generally by numeral 10. The system 10 has a pair of valves 12 and 14, respectively for allowing the pressurized gas to flow into one or the other of the beds A or B. For example, as bed A is receiving pressurized gas through line 24 and producing nitrogen product through a line 30, bed B undergoes regeneration wherein a portion of the product gas flows through valves 34 and 36 via the line 38 into the bed B. The impurities contained within the bed B are then vented from the system 10 via the line 26, the valve 18 and an exit port 28. Alternatively, the system can be provided with a separate source of gas for regenerating the exhausted bed.

The system 10 may also contain a pressure equalization system to equalize the pressure of the beds after one of the beds has been regenerated. An equalization line 40 is comprised of a switching valve 42 and a control orifice 44 for allowing the passage of pressurized gas from one bed to partially raise the pressure of the regenerated bed. Such equalization systems are well known in multi-bed PSA systems.

In accordance with the present invention, the product nitrogen gas flows through the line 30 from bed A and via a line 32 from bed B. The product flow is controlled by respective valves 46 and 48, but a change in user product demand is brought about by adjusting the valve 54. Such adjustments raise or lower the rate of flow of the nitrogen gas through a common product line 50 and valve 52.

A sensing device 55 including a device 56 for measuring a force or a pressure difference intrinsically related to the flow rate and a device 58 for converting the force or pressure difference to a signal proportional to the flow rate is connected to the common product line 50. The electrical signal is sent to a device, such as a computer 60, which interprets the electrical signal and converts it to a digital output for product flow rate. A number of electrical signals are received from the sensing device 55 and an average reading is obtained and compared with a standard. The average reading therefore provides a reliable and accurate indication of the change in product flow rate demand.

The digital output is sent to a converter 64 wherein it is converted via an electrical signal to a pressure signal which controls a valve 66 and thereby regulates the rate at which the compressed feed gas enters the PSA system.

The computer 60 is connected to a logic controller 62 which in turn is connected to all of the switching valves employed in the nitrogen production and regeneration cycle. In particular, the controller 62 is operatively connected to the nitrogen product valves 46, 48, and to the regeneration system valves 16, 18, 20 and 42 and to all of the valves in the equalization system. The controller 62 sends a signal controlling the opening and closing of the valves to provide for a pressurization time in accordance with the current feed rate.

In operation, the user determines the specified product flow rate and compares the same with the previously determined product flow rate. If they are different then the corresponding feed flow rate necessary for the user specified product flow is determined using the computer 60. The feed flow rate is then adjusted accordingly.

Figure 2:
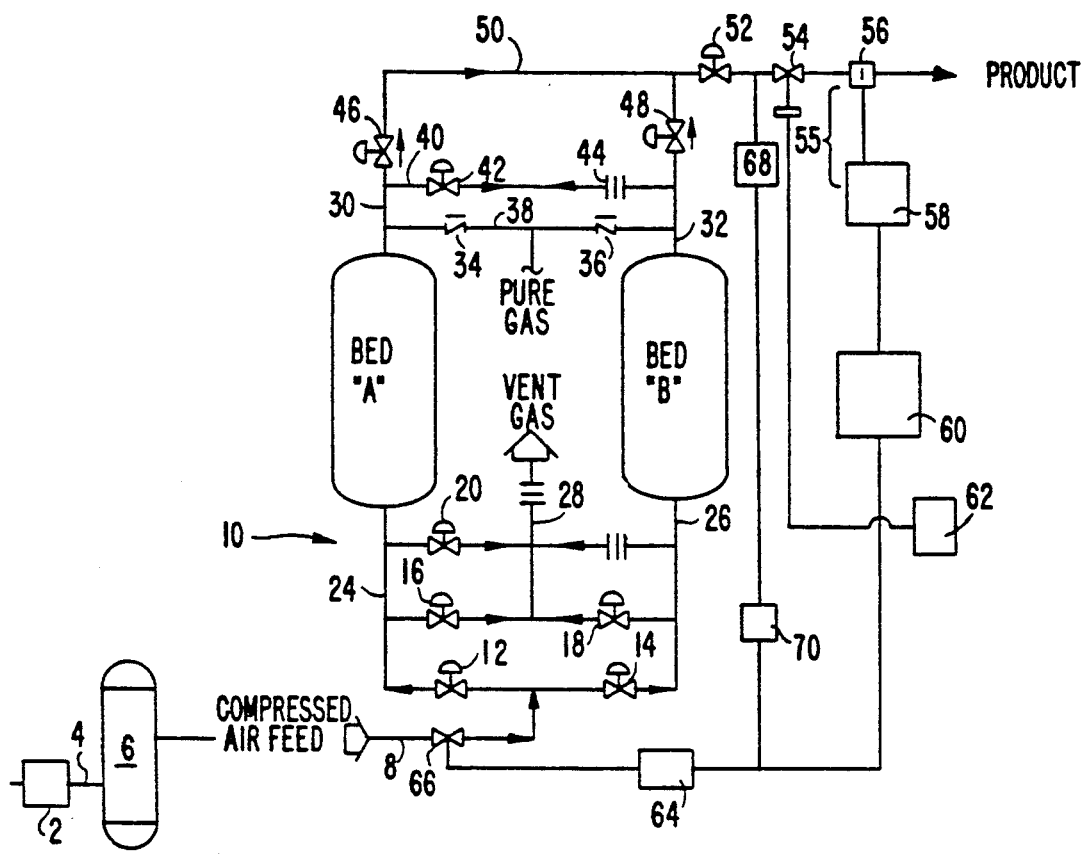
FIG. 2 is a schematic view of another embodiment of the invention similar to the embodiment shown in FIG. 1 but further including a system for adjusting the feed flow rate in response to a change in the desired purity level.

Referring to FIG. 2, there is shown another embodiment of the invention wherein adjustments are made to the feed flow rate to accommodate purity drift arising from a change in product demand. Connected to the common product line 50 is a sensor 68 which measures the level of impurities in the product gas. For example, in the separation of air, the sensor measures the concentration of oxygen and sends a corresponding electrical signal to a device 70 which translates the electrical signal and converts it to a digital output. In a preferred form of the invention, the device 70 is part of the computer 60 used to translate and convert the electrical signal received from the product flow rate sensing device 55.

In operation, after the feed flow is adjusted in accordance with a change in product demand, the purity of the product is sensed and compared with a given purity level for the product flow. If there is a change in purity level an electrical signal is sent from the sensor 68 to the computer means 70 where the electrical signal is translated and converted to a signal, such as an electrical signal, corresponding change in the feed flow rate. The converter 64 receives the electrical signal for the new feed rate from the computer 70 and emits a pressure signal to adjust the control valve 66 to make minor adjustments to the feed flow rate and thereby change the level of impurities in the product stream to its original value.

A typical full cycle of the control system of the present process in accordance with FIG. 2 is shown below.

FLOW CHART 1

Step 1: Determine the desired product flow rate (1) and compare with the previously determined product flow rate (2). if (1) and (2) are different proceed to step 2; if not, proceed to step 4.

Step 2: Determine the corresponding feed flow rate necessary for the desired product flow using a turndown computer and adjust the feed flow rate accordingly.
Step 3: Adjust the feed flow rate to the new feed flow rate by a feed control, and adjust the product take-off time to meet new product demand.
Step 4: Sense the product purity and compare with the purity of the original product flow.
Step 5: Adjust the purity trim and determine the corresponding feed rate desired.
Step 6: Further adjust the feed flow by the feed control.
Step 7: Return to step 1.

The steps in the control algorithm occur at a frequency that is independent of the PSA cycle and its operation.

Essentially, the feed gas flow rate and thereby pressurization and/or production times are adjusted first to compensate for varying product gas demand. The product gas is then sensed or tested to determine its purity, and further relatively minor adjustments in feed gas flow are made to regulate purity essentially without affecting product gas flow.

Operation parameters of the PSA plant and treatment zones are those familiar to one of ordinary skill in the art. In preferred embodiments, the feed gas comprises air, and the product gas comprises nitrogen. The impurity generally is oxygen if nitrogen is produced, and preferably, oxygen will not be present in the product in a quantity of more than 10,000 ppm. The production pressure generally ranges from about 75 to about 150 psig and preferably is about 85 psig.

DETAILED DESCRIPTION OF THE INVENTION

The following examples illustrate the invention without limitation. All parts are given as a percent by weight unless otherwise indicated.

EXAMPLES 1–13

A series of experimental runs was conducted utilizing a multi-zone PSA unit described in connection with FIG. 2 having treatment zones containing carbon molecular sieve as the adsorbent. The production pressure was set at 85 psig, to yield nitrogen gas with levels of impurities of 0.01%, 0.1%, 0.5% and 1.0%, respectively. The desired product turndown was achieved by turning down the feed according to the method of the present invention.

Figure 3:
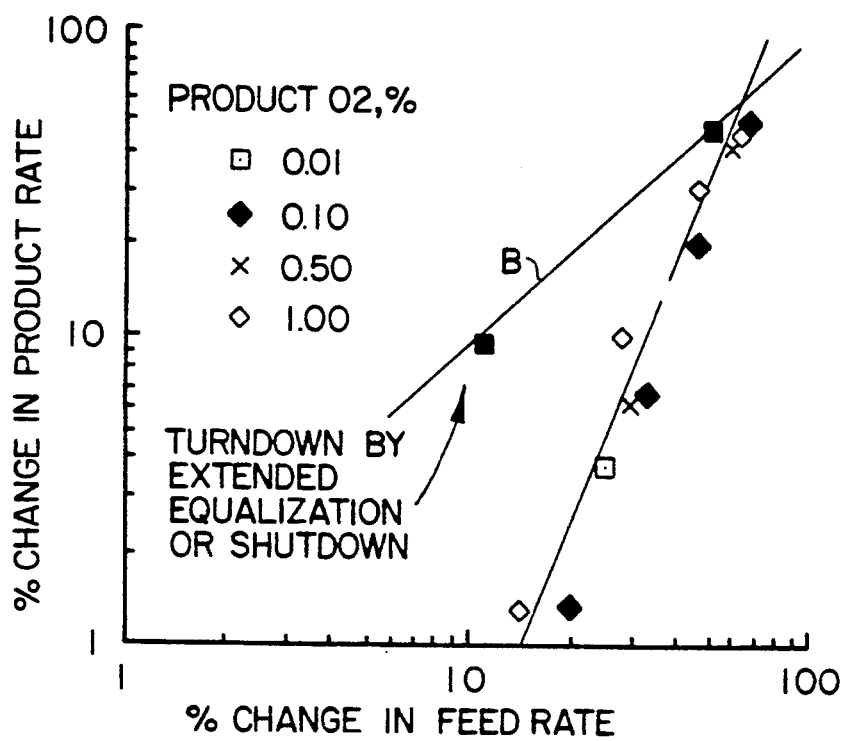
FIG. 3 is a graph showing the change in the feed flow rate for a given change in product demand at a constant purity level.

The results are illustrated in FIG. 3 and are summarized in Table 1.

COMPARATIVE EXAMPLES 14 AND 15

A series of experimental runs was conducted utilizing the same PSA unit as in Example 1. The desired product turndown was achieved by shutting down the system as illustrated in curve B of FIG. 3.

The results are illustrated in FIG. 3 and are summarized in Table 1.

COMPARATIVE EXAMPLE 16

An experimental run was conducted utilizing a PSA unit as in Example 1. The desired turndown was achieved by extending the equalization time as illustrated in curve B of FIG. 3.

The results are illustrated in FIG. 3 and are summarized in Table 1.

A comparison between Examples 1–13 of the present invention and Comparative Examples 14–16 illustrates that in the present invention the reduction in feed flow is much greater than the reduction in product flow, especially for small levels of production turndown as compared to the prior art. Consequently, the present invention gives the highest possible yield at any operating conditions.

TABLE 1

| | | | | | | TURNDOWN OPTIMIZATION | | | | | | | | | |
|---|---|---|---|---|---|---|---|---|---|---|---|---|---|---|---|
| 1 | 2 | 3 | 4 | 5 | 6 | 7 | 8 | 9 | 10 | 11 | 12 | 13 | 14 | 15 | 16 |
| 0.01 | 0.01 | 0.1 | 0.1 | 0.1 | 0.1 | 0.1 | 0.5 | 0.1 | 1.0 | 1.0 | 1.0 | 1.0 | 0.1 | 0.1 | 0.1 | $O_2$ Concentration (%) |
| 3.8 | 13.5 | 1.34 | 6.6 | 20 | 50 | 60 | 6.2 | 42 | 1.3 | 10 | 30 | 46 | 10 | 49 | 50.5 | Product Turndown (%) |
| 25 | 39.8 | 19 | 32 | 48 | 65 | 69 | 28.5 | 59 | 14 | 28.5 | 46 | 64 | 10 | 51 | 46 | Feed Turndown (%) |

EXAMPLE 17

Combined Feed Forward/Feedback Model

An experimental run was conducted using a PSA unit as in Example 1. Initially, the PSA unit was operated at an air feed rate of 130 scfh/cf CMS (carbon molecular sieve), a product gas rate of 35 scfh/cf CMS, and a product gas purity of 0.1% oxygen. In response to a turndown in product gas rate of 61.4% to 13.5 scfh/cf CMS, the turndown relationship in FIG. 3 predicts that the feed rate must decrease by 70% in order to maintain product gas purity. Accordingly, the feed rate is decreased 70%, to 39 scfh/cf CMS. As the run progresses, the purity control system makes minor increases in the feed rate in order to maintain a product gas purity of 0.1% oxygen, finally arriving at a steady feed rate of 44 scfh/cf CMS. In making the change in feed rate, the effective cycle time, which is twice the sum of the adsorption, production, and equalization times, goes from approximately four minutes to approximately twenty minutes.

Many variations of the present invention will suggest themselves to those skilled in the art in light of the above, detailed descriptions. All such obvious variations are within the full intended scope of the appended claims.

We claim:

1. A method of producing a purified product gas at a user specified product gas demand from a feed gas containing impurities in a pressure swing adsorption system comprising the steps of:
    (a) introducing said feed gas into at least one treatment zone containing an adsorbent selective for one or more of said impurities, thereby raising the pressure in said treatment zone from an initial pressure to production pressure;
(b) passing said feed gas through said at least one treatment zone, thereby producing said purified product gas;
(c) flowing said purified product gas to said user at a given demand, said demand being subject to change;
(d) continually measuring a change in product gas demand and generating a first signal which is proportional to the change in product gas demand;
(e) translating the first signal and comparing the translated signal to a standard;
(f) converting the translated signal to a second signal; and
(g) employing the second signal to continually adjust the rate of feed gas entering the pressure swing adsorption system so that it is commensurate to the new product gas demand.

2. The method of claim 1 wherein the stop of measuring a change in product demand comprises detecting a change in pressure decrease caused by the flow of product gas through a restrictive means and converting the change in pressure decrease into said first signal.

3. The method of claim 2 further comprising evaluating and controlling the time for pressurizing the pressure swing adsorption system at a given feed rate.

4. The method of claim 1 further comprising:
(a) measuring the level of impurities in the product gas and generating a third signal corresponding to said level of impurities; and
(b) varying the feed gas flow rate in response to said third signal to thereby adjust the level of impurities to a desired level.

5. The method of claim 4 wherein the stop of measuring the level of impurities comprises generating a fourth signal corresponding to the level of impurities in the product gas, translating the fourth signal and comparing it to a standard, and converting the translated signal to a fifth signal which causes a controllable feed gas adjustment means to make minor adjustments to the rate of feed gas entering the inlet region.

6. A pressure swing adsorption system for the production of a purified product gas at a user specified product gas demand from a feed gas containing impurities comprising:
(a) at leas tone treatment zone containing an adsorbent selective for one or more of said impurities, and comprising an outlet region for recovering product gas and an inlet region for receiving a feed gas and adapted to the practice therein of a pressure swing adsorption process having a cycle which includes a feed step comprising a pressurization period and a production period;
(b) means connected to the outlet region for continually measuring a change in product gas demand and for generating a first signal corresponding to the change in product gas demand;
(c) means for translating the first signal generated from the measuring means and comparing the translated signal to a standard; and
(d) means for converting the translated signal to a second signal adapted to operate a controllable feed gas adjustment means which is adapted to continually adjust the rate of feed gas entering the inlet region.

7. The PSA system of claim 6 wherein the means for measuring a change in product demand comprises electronic means for measuring a pressure decrease caused by the product gas flowing through a restrictive means, and means for converting the pressure decrease into said first signal.

8. The PSA system of claim 7 wherein the means for translating the first signal received from the measuring means comprises a computer means.

9. The PSA system of claim 8 further comprising valve means for controlling the rate of flow of the feed gas into the treatment zone wherein the means for converting the pressure decrease into an electrical signal comprises a converter adapted to receive the second signal from the computer means and for converting the second signal to a pressure signal which causes the valve means to change the feed rate.

10. The PSA system of claim 6 further comprising means operatively connected to the means for translating the first signal for evaluating and controlling the pressurization time required in the treatment zone for a given feed rate.

11. The PSA system of claim 6 further comprising:
(a) means for measuring the level of impurities in the product gas obtained from the outlet region and generating a third signal corresponding to said level of impurities; and
(b) means for varying the feed flow rate in response to said third signal to thereby adjust the level of impurities to a desired level.

12. The PSA system of claim 11 wherein the means for measuring the level of impurities comprises means for generating a fourth signal corresponding to the levels of impurities in the product gas, and means for translating the fourth signal and comparing it to a standard and converting the translated signal to a fifth signal adapted to operate the controllable feed gas adjustment means to make minor adjustments to the rate of feed gas entering the inlet region.

13. The PSA system of claim 12 wherein the means for translating the fourth signal comprises computer means and said fifth signal is a pressure signal.

14. The PSA system of claim 6 wherein said feed gas is air and said purified product gas is nitrogen.

15. The PSA system of claim 14 wherein said nitrogen gas contains no more than 10,000 ppm of oxygen as an impurity.

16. The PSA system of claim 6 comprising a plurality of treatment zones.

17. The PSA system of claim 6 wherein said adsorbent is selected from the group consisting of zeolite, zeolite molecular sieves, carbon molecular sieves, activated carbon, silica compounds, aluminum compounds, or a combination of any of the foregoing.

* * * * *

UNITED STATES PATENT AND TRADEMARK OFFICE
CERTIFICATE OF CORRECTION

PATENT NO. : 5,258,056
DATED : November 2, 1993
INVENTOR(S) : Shirley et al.

It is certified that error appears in the above—identified patent and that said Letters Patent is hereby corrected as shown below:

Column 9:

Claim 2, line 22, delete "stop" and substitute --step-- therefor.

Claim 3, line 27, delete "2" and substitute --1-- therefor.

Claim 5, line 37, delete "stop" and substitute --step-- therefor.

Claim 6, line 51, delete "leas tone" and substitute --least one-- therefor.

Signed and Sealed this

Ninth Day of May, 1995

*Attest:*

BRUCE LEHMAN

*Attesting Officer*      *Commissioner of Patents and Trademarks*